United States Patent [19]

Thaller

[11] Patent Number: 5,594,875
[45] Date of Patent: Jan. 14, 1997

[54] METHOD AND APPARATUS TO PROVIDE PENDED TRANSACTION ON A NON-PENDED SYSTEM BUS

[75] Inventor: Kurt M. Thaller, Acton, Mass.

[73] Assignee: Digital Equipment Corporation, Maynard, Mass.

[21] Appl. No.: 270,187

[22] Filed: Jul. 1, 1994

[51] Int. Cl.$^6$ .............................. G06F 13/14; G06F 13/42
[52] U.S. Cl. .......................... 395/287; 395/309; 395/856
[58] Field of Search .................................... 395/285, 286, 395/309, 856, 287

[56] References Cited

U.S. PATENT DOCUMENTS

| | | | |
|---|---|---|---|
| 4,706,190 | 11/1987 | Bomba et al. | 395/288 |
| 4,949,239 | 8/1990 | Gillett, Jr. et al. | 395/288 |
| 5,150,467 | 9/1992 | Hayes et al. | 395/287 |

*Primary Examiner*—Glenn A. Auve
*Attorney, Agent, or Firm*—Joanne N. Pappas; Denis G. Maloney; Arthur W. Fisher

[57] ABSTRACT

A data processing system includes a plurality of nodes connected to a shared data path, one of said plurality of nodes being a commander node to initiate a transaction on said shared data path, and one of said plurality of nodes being a responder node. The system also includes means for providing, by said responder node, a response to said commander node indicating unavailability of said responder node and for providing an acknowledgement of said transaction over said shared data path; and means, directly responsive to said response indicating that said responder node is unavailable to respond to said transaction, for retrying said transaction. In this manner, a retry mechanism can be implemented on a bus which does not directly support a retry signal.

14 Claims, 7 Drawing Sheets

METHOD AND APPARATUS TO PROVIDE PENDED TRANSACTION ON A NON-PENDED SYSTEM BUS

BACKGROUND OF THE INVENTION

This invention relates generally to computer systems, and more particularly to the access of input/output (I/O) devices in a non-pended bus design.

As it is known in the art, computer systems generally include at least one central processing unit (CPU), a main memory for storing data, at least one input/output (I/O) interface, and a system bus coupling the aforementioned devices to the CPU. The I/O interface generally has at least one port which is coupled to an I/O bus. The I/O bus provides access to one or more devices coupled to the I/O bus.

Generally, I/O interfaces are used to transfer data between the system bus and the I/O bus such that devices on the I/O bus are coupled to the remainder of the computer system. Many different types of devices may be resident on the I/O bus. For example, storage devices, devices which couple the I/O bus to other remote buses including other system buses within other computer systems, and other I/O buses, etc.

A basic problem encountered in computer systems is that I/O resources can, at times, be unavailable for a CPU to access because they are "busy". This problem can be aggravated in a multiprocessing system when a system bus has bandwidth greater than available I/O bandwidth.

One approach used to handle the problems associated with I/O resource unavailability is the use of a pended system bus. A pended system bus is a bus which allows multiple transactions to be outstanding, or in progress, at the same time. On a pended system bus, while one CPU is trying to access an I/O device which is currently busy, other CPU and bus initiators can continue to use the system bus. The system bus, therefore, is not stalled, as it is in the case of non-pended buses (discussed below), while waiting for I/O device access.

Unlike a pended bus, a non-pended bus allows only one transaction to be in progress at any given time. In the past, in order to solve the problems associated with I/O resource unavailability in non-pended bus designs, the I/O device stalls the requested transaction until it is able to satisfy the request. For example, the time it generally takes the I/O device to accomplish a task, such as a read from or a write to a memory, is many times greater than the clock cycle time of the CPU. Hence, the CPU waits on the system bus until the I/O device access is complete. This has a disadvantage in that it prohibits any other bus traffic from occurring while the stall is taking place. Further, the stall time could potentially be very long. Therefore, performance problems arise since the system bus cycle time is consumed while waiting for the I/O device access to complete.

One performance problem that may arise with stalling a non-pended bus while waiting for the I/O device access to complete, is the problem of "deadlock." A deadlock can occur when the CPU has control of the system bus and is stalled waiting for an I/O device access to complete while the I/O device has control of the I/O bus and is stalled waiting for the access to complete. When there is a deadlock neither transaction can proceed to completion, thereby hanging the buses indefinitely.

A deadlock can be discovered by timeout hardware which allows a certain maximum time limit for a transaction to complete before it will "time out." Upon discovery of a deadlock using this time limit, one solution to the deadlock situation is for the I/O device and the CPU to stop waiting on their respective buses and retry the transaction. Such a retry can be implemented in hardware and is one way to avoid the potential problems of stalling and deadlocks evident in a non-pended bus. An example of a retry signal implementation on a bus is described in U.S. Pat. No. 4,706,190. While suitable for use in a bus which directly supports a retry signal, such an arrangement requires that the signal bus protocol and hardware make provisions for assertion of the retry signal on the bus. This retry mechanism is not useful for those buses which are not specifically designed to support a retry signal.

SUMMARY OF THE INVENTION

In accordance with the present invention a data processing system includes a plurality of nodes connected to a shared data path, one of the plurality of nodes being a commander node to initiate a transaction on the shared data path, and one of the plurality of nodes being a responder node. The present invention further includes means for providing, by the responder node, a response to the commander node indicating unavailability of the responder node and for providing an acknowledgement of the transaction over the shared data path and means, directly responsive to the response indicating that the responder node is unavailable to respond to the transaction, for retrying the transaction.

With such an arrangement, layering a hardware retry mechanism within the constructs of a non-pended bus, the problems of stalling and deadlock are avoided in a non-pended bus which does not support a retry mechanism. This arrangement thus permits pended transactions (i.e. multiple transactions in progress at the same time) on a non-pended bus. This is accomplished by permitting the I/O responding device to defer an access request (i.e. a read or write) until resources are cleared up and the transaction can complete.

BRIEF DESCRIPTION OF THE DRAWINGS

The above-mentioned and other features of the invention will become more apparent by reference to the following description taken in connection with the accompanying drawings in which.

DESCRIPTION OF THE PREFERRED EMBODIMENT

Figure 1:
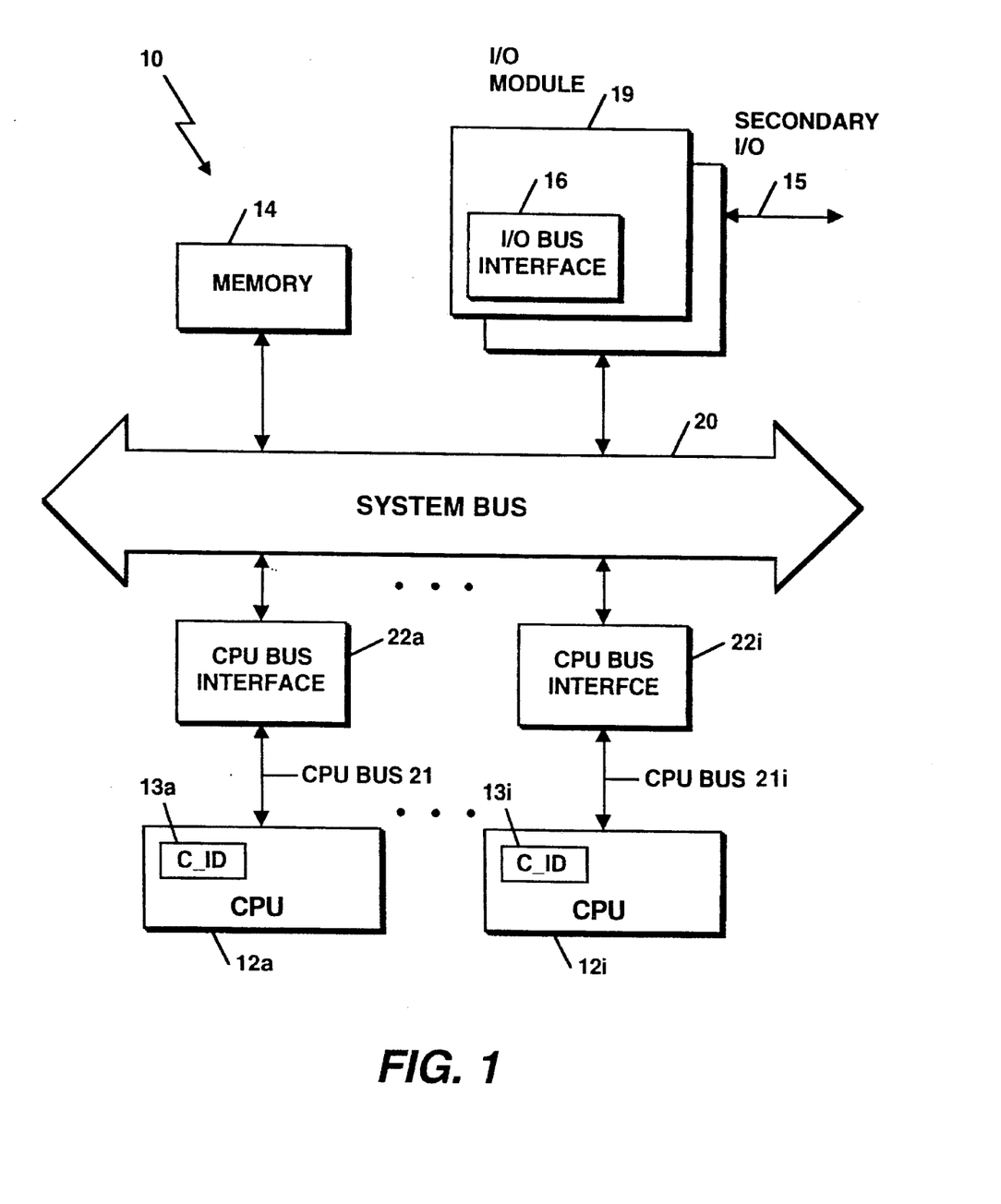
FIG. 1 is a block diagram of a computer system.

Referring now to FIG. 1, a computer system 10 is shown to include one or more central processing units (CPU)

modules 12a–12i, a main memory 14, one or more input/ output (I/O) modules 19, input/output (I/O) Bus Interfaces 16, a secondary I/O bus 15, and a system bus 20 which, as will be discussed below, control a retry mechanism of the CPUs 12a–12i. For simplicity, CPU 12a will be used for discussion in conjunction with FIG. 1 below.

In general, FIG. 1 is a simplified representation of any suitable computer system on which a retry mechanism will be provided. The computer system 10 can be viewed as comprised of a plurality of nodes which are referred to as commander nodes, when one of said nodes initiates a transaction on the system bus 20. Each of the nodes can alternatively be viewed as a responder node when the node responds to transactions initiated by a commander node. Typically, any of the CPU modules 12a–12i will act as the commander node and implement a hardware retry mechanism to allow a responding module (i.e. I/O Bus Interface 16, Memory 14, secondary I/O bus 15 and CPUs 12a–12i) to defer the read or write request until resources are cleared up and the transaction can complete. This mechanism will be described for use by the I/O module 19 and secondary I/O bus 15, however, architecturally, it may be available for any device accesses, to simplify implementation.

READ

As an illustrative example, in the implementation of a read request, the CPU 12a requests to read from the I/O module 19, and the following sequence of events will occur:

1. The CPU bus interface 22a will issue a read command to an address of the designated I/O module 19 over the system bus 20;
2. The I/O module 19 will respond to the read command from the CPU 12a by performing one of the following three actions:

RETURN REQUESTED DATA

The I/O module 19 will acknowledge the command by asserting an ACK signal to the CPU bus interface 22a and then return requested data, at which point, the CPU bus interface 22a returns the requested data to the CPU 12a.

RETRY

When the I/O module 19 is not ready to return the requested data, the retry mechanism is initiated by the I/O module 19. The retry mechanism can be caused by several events. For example, one event is that the requested data is not ready to satisfy the read request because the requested address falls into a secondary I/O 15 space. Such a secondary I/O 15 could be on another bus, for example, a Peripheral Component Interconnect (PCI) bus which may be coupled to other peripheral computer components. The CPU 12a may want to read from or write to these components. The retry mechanism is almost always asserted in this situation because of the unknown access latency to secondary I/O 15. That is, it is generally known to take a longer time to respond to a secondary I/O 15 request than for a local I/O request (i.e. a request where the data is located at the I/O bus interface 16 generally involves no latency). Another event causing a retry assertion is that the I/O bus interface 16 is not available.

In either case, the CPU 12a has control of the system bus 20, but is waiting for an I/O device access to complete, and if the I/O module 19 simultaneously has control of the secondary I/O 15 and is stalled waiting for the access to complete, a deadlock has occurred.

The system bus 20 provides for seven (0–6) cycles where the CPU 12a can initiate a write or read transaction over the system bus 20 to the I/O module 19. The system bus 20 supports a CERR_L signal which, in general, is used to indicate that there has been an error, such as a parity error, or a time-out error. This CERR_L signal is predefined in cycles idle, 0, and 1 to indicate to the CPU 12a that there is an error with the initiated transaction of the CPU 12a. In the preferred embodiment, the CERR_L signal is used in remaining cycles other than in predefined cycles idle, 0, or 1 to indicate that a retry of the transaction should occur.

The system bus 20, although it does not directly support a retry signal, can therefore, by judicious use of signals on the bus 20, layer a retry mechanism into the protocol of the bus 20. Here, signal CERR_L is generally asserted by an I/O module 19 during fixed cycles to indicate an error. This signal is asserted during cycles idle, 0, or 1 (FIG. 4) to indicate an error condition. A signal ACK_ is also used by the I/O module 19 to acknowledge receipt of the transaction. Using these two signals, the I/O module 19 through the I/O bus interface 16 will request the CPU 12a to "retry" the transaction (i.e. request the read again) since the transaction will take a longer time to complete than a response which immediately provides data. This "retry mechanism" is accomplished by the I/O bus interface 16 asserting the CERR_L signal during cycle 3 (not one of the defined cycles for assertion of an error) and deasserting the CERR_n signal during cycle 4, as is discussed below with respect to FIG. 5B. The CPU 12a will then relinquish control of the system bus 20. Upon receiving an acknowledgement and the CERR_L signal from the I/O module 19, the I/O bus interface 16 will still drive data ("faux" or fake data) with good parity on cycles 5 and 6 to CPU bus interface 22a via system bus 20 even though the contents of the data will be ignored. The reasons for driving "faux" data will be described in further detail in conjunction with FIG. 2 and FIG. 5B. The CPU bus interface 22a will then immediately retry the transaction by rearbitrating for the system bus 20.

On an idle bus, there may be between zero and three or more idle cycles before the retried transaction by the CPU 12a through the CPU bus interface 22a occurs, depending on the implementation of the bus. For a non-idle bus, there may be many more cycles. Further, there is no limit to the number of retries that the CPU 12a will attempt. It is the duty of the I/O module 19 to eventually respond by either returning to the CPU requested data, or aborting due to a severe failure (i.e., data is bad, or time-out at another bus).

ABORT

The I/O bus interface 16 will abort the transaction by not acknowledging the transaction if it cannot perform the transaction because of an I/O system problem. This will notify the CPU bus interface 22a to return a Hard Error to the CPU 12a which will subsequently cause a machine check. In addition, the CPU 12a will log the "no acknowledgement" and assert an error signal, CERR_L, on the CPU bus 21 during one of the three error cycles, Idle, 0, or 1, as described below in FIG. 4. The I/O module 19 is responsible for logging the information that the error was due to a failure, such as time-out at another bus or data is bad.

WRITE

For a write command, if the CPU 12a requests a write of certain data to designated I/O module 19 or secondary I/O 15, the following sequence of events will occur:

1. The CPU bus interface 22a will issue a write command to an address of the designated I/O module 19 over the system bus 20;
2. The I/O module 19, will respond to the write request from the CPU 12a by performing one of the following actions:

ACCEPT WRITE DATA

The I/O module 19 will accept and acknowledge the requested data by asserting an ACK signal to the CPU bus interface 22a, at which point, the CPU bus interface 22a then responds to the CPU 12a with a similar acknowledgement by asserting an ACK signal to the commander node, CPU 12a.

RETRY

In the event that the I/O module 19 or secondary I/O 15 is not ready to perform the write, the I/O bus interface 16 will request that the transaction be retried since the write transaction cannot currently be serviced. The I/O bus interface 16 will assert signal CERR_L during cycle 3 and deassert CERR_L during cycle 4, signifying to the CPU bus interface 22a that the CPU 12a should retry the write command. The write with retry timing is described below in FIG. 6B. The CPU bus interface 22a will then immediately retry the transaction originally initiated by the CPU 12a by rearbitrating for the system bus 20. On an idle bus, there may be between zero and three or more idle cycles before the retried transaction occurs depending upon the implementation of the bus. For a non-idle bus, there obviously may be many more cycles. There is no limit to the number of retries that the CPU 12a can attempt. It is the responsibility of the I/O module 19 to eventually either accept the transaction, or abort, due to a severe failure such as time-out at another bus or bad data.

ABORT

Figure 4:
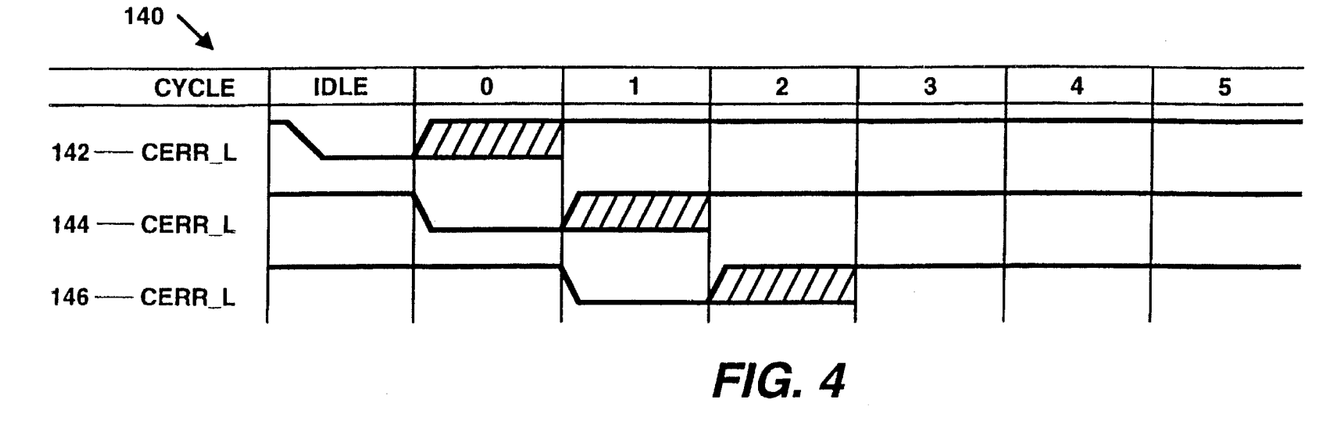
FIG. 4 is a timing diagram indicating typical error cycles.

The I/O bus interface 16 will abort the transaction by not acknowledging the retried transaction if the I/O bus interface 16 cannot perform the transaction because of an I/O system problem. This will notify the CPU bus interface 22a to return a Hard Error to the CPU 12a which will subsequently cause a machine check. In addition, the CPU 12a will log the "no acknowledgement" and assert an error signal, CERR_L, on the CPU bus 21 during idle, 0, or 1 cycles as shown in FIG. 4. The I/O module 19 is responsible for logging the information that the error was due to a failure.

It is the responsibility of the I/O module 19 to ensure that deadlock cannot occur for a multi-processor system. The I/O module 19 may be responsible for many CPUs (i.e. eight) present on the system bus 20.

The preferred way for the I/O bus interface 16 to function, with respect to when to use the above-described retry mechanism, is as follows:

READ

When a read command occurs to secondary I/O 15, such as to the PCI bus, for example, the commander identification (C_ID) 13a of CPU 12a is saved by the I/O bus interface 16. Each CPU 12a–12i connected to the system bus 20 has a different commander ID which is used to preserve ordering when different CPUs are retrying different transactions. The first CPU whose transaction is retried will have its C_ID logged and will be the first to successfully complete the transaction. The read request from the CPU 12a is issued to secondary I/O 15 (PCI) to satisfy the read command. The I/O bus interface 16 acknowledges the command but asserts a CERR_L signal during cycle 3 to indicate that a retry of the transaction should take place. The I/O module 19 then issues a request to the secondary I/O 15 for the requested data. Subsequent transactions from the system bus 20 to the secondary I/O 15 (PCI bus), whether they be reads or writes, are all deferred using the retry mechanism until the previously requested secondary I/O data is available at the I/O bus interface 16 and a "Ready" signal is sent to the state machine of the system bus 20. The commander ID (C_ID) of the transaction on system bus 20 is compared to the saved C_ID. If they are not equal, the request is "retried". If the compared request is equal, then data is returned on the system bus 20 and the buffer resource is again made available.

If a secondary I/O 15 error (such as a PCI error of parity, time-out, or invalid address), occurs attempting to satisfy the read request, the read command is "NO-ACKED" or not acknowledged the next time it is requested. This subsequently causes the commander to signal that a bus error has occurred by asserting CERR_L signal during cycles idle, 0, or 1 as described in FIG. 4.

WRITE

For a system bus write to secondary I/O 15, the write request is issued to secondary I/O 15 and the buffer resource is marked as "used". Subsequent system bus write transactions to secondary I/O 15 space are deferred using the retry mechanism described above until the previously requested secondary I/O write has completed and the buffer resource is freed up.

In this way, the present invention implements the retry mechanism such that it is compatible with an existing bus implementation and does not require any physical changes to the existing system bus. Although minor logic changes in state machines which control the I/O bus interface 16 would be needed, no change to physical bus signals and their interconnection to the I/O bus interface 16 is needed. Specifically, a bus signaling mechanism is layered onto a suitable signal, such as the CERR_L signal. Previously, the CERR_L signal was defined to be valid only during an idle bus, cycle 0 or cycle 1 as shown in FIG. 4 (described below). Here, the CERR_L signal is used for a retry such that, during cycle 3 to cycle 4, the assertion of this signal, along with an ACK_L assertion, indicates a request from the I/O bus interface 16 to the commander CPU 12a to retry this transaction. No software knowledge of the retry is required as it is defined such that the hardware interface will be responsible for retrying the transaction until it finally succeeds or fails with an error condition.

It should be noted that the CPUs 12a–12i have caches (not shown) associated with them. However, in the preferred embodiment, because of the way cache coherency is maintained on the system bus 20 during read and write transactions, the retry is not allowed during memory references, but only during I/O accesses. This still solves the original problem of a non-pended bus design which allows only one transaction to be in progress at any given time. Further, the impact to existing hardware is minimized.

In the preferred embodiment, as described above, to prevent deadlock and preserve ordering, the I/O bus interface 16 is required to latch the Commander Identification (C_ID) 13a–13i when "retrying" a transaction. Other nodes attempting to access the I/O module 19 may retry as well, but the first node whose C_ID 13a was latched will be the first node allowed access once the I/O module 19 resource is again available.

It should also be noted that in the preferred embodiment, a CPU 12a may issue a read command to a device on the I/O module 19 and then subsequently be required to retry that read command. A subsequent read from a different CPU 12i, however, cannot go through to the I/O device that the prior read command from CPU 12a is retrying from until the prior read is satisfied. A subsequent read command can go through to other devices, e.g., internal status registers.

In summary, there are basically three I/O bus interface 16 responses to the CPU 12a–12i read or write requests. These three responses are:

(1) an acknowledgement (ACK) which would return data;
(2) an acknowledgement (ACK) with the CERR_L signal being asserted in cycle 3 which initiates a retry, or;
(3) "no acknowledgement" (NO_ACK) which would, in turn, cause a Hard Error or abort condition.

The second I/O response above would be effectively requesting a retry of the transaction, whether it be a read or write, causing the CPU bus interface 22a to rearbitrate for control of the system bus 20.

Figure 2:
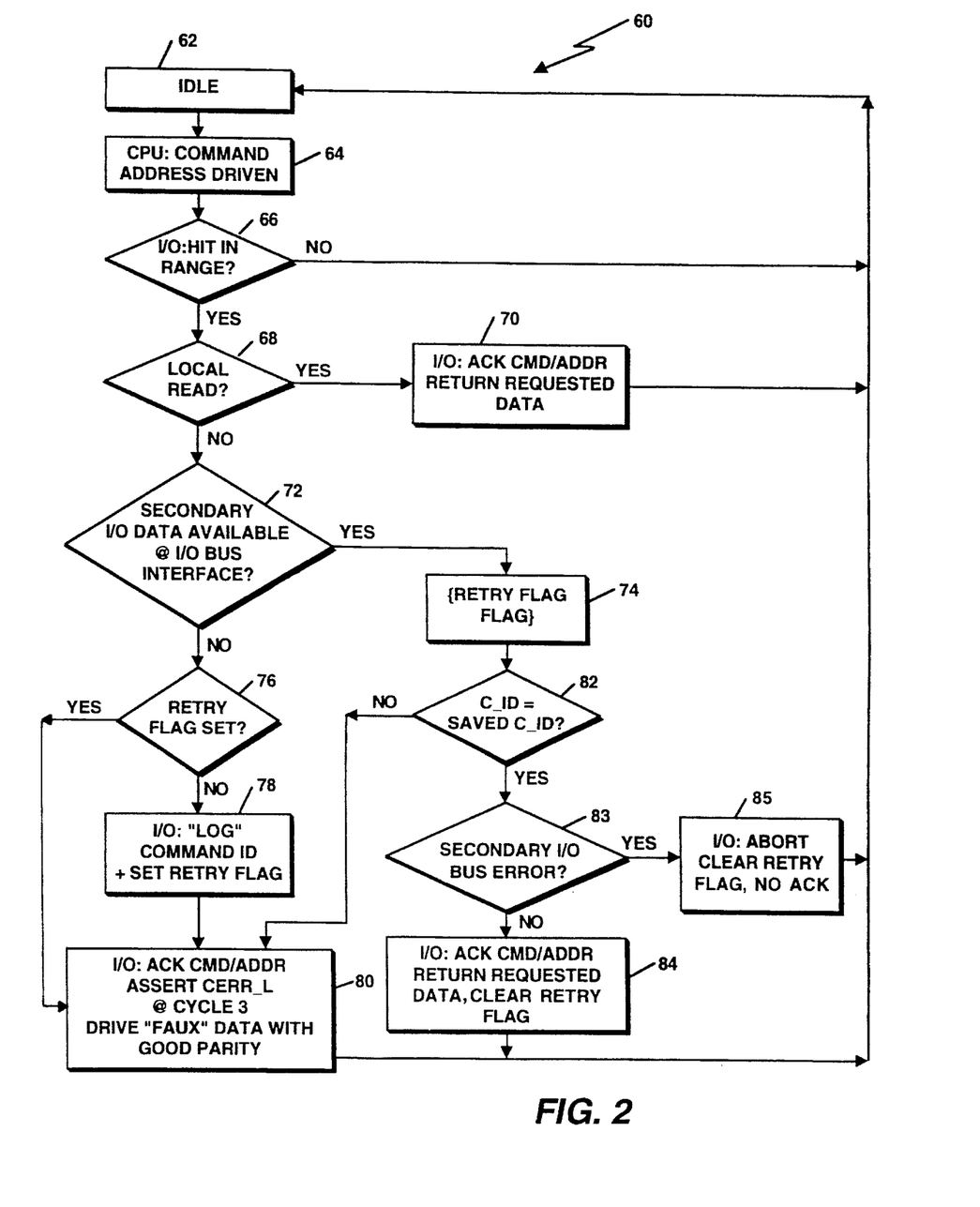
FIG. 2 is a detailed flow diagram of a read from I/O space involving retries.

Referring now to FIG. 2, a flow sequence 60 describing a read request to designated I/O module 19 with steps performed by the CPU 12a and I/O module 19 is shown.

In step 62, the computer system 10 is shown to be Idle and waiting for the commander node, CPU 12a, to issue a read command. At step 64, the CPU 12a generates an I/O read command on the system bus 20 with the address of the designated location in I/O module 19 where it wants to "read" data from. At step 66, "I/O: Hit in Range?" the I/O module 19 determines whether the location of the data that is being requested by the CPU 12a is in the address space range of the I/O module 19. A negative (No) response leads back to step 62 or the Idle position step. A positive (yes) response leads to step 68, to determine if the data is currently available in I/O module 19 (i.e. whether the read was a "local read?") If data is locally available, the I/O module 19 will, in step 70, return the requested data through I/O bus interface 16 and over system bus 20 to the CPU bus interface 22a which will return the requested data to the CPU 12a. Further, the I/O module 19 will acknowledge the read command by asserting an ACK signal to the commander node.

If the determination in step 68 is that data is not locally available, but lies in secondary I/O 15 address space, then step 72 determines if the secondary I/O 15 data is available at the I/O bus interface 16. Here again, there can be positive (Yes) and negative (No) responses. The response will be positive if the secondary I/O 15 data has been retrieved and is available at the I/O bus interface 16. The response will be negative if the secondary I/O 15 data has not been retrieved and is not available at the I/O bus interface 16.

If the data is not available, then there is a negative response to step 72 which leads to step 76. At step 76, the RETRY flag is tested. The RETRY flag is set by the I/O bus interface 16 once CERR_L is asserted during cycles 3 to 4 for a transaction to be retried. If the response is "yes", then step 80 provides that the I/O bus interface 16 will acknowledge the command and address, assert CERR_L during cycle 3, and drive "faux" or fake data with good parity back to the commander node. This "acknowledgement with retry" step 80 is done for the purpose of making the transaction adhere to the protocol of the system without an error or machine check to occur (i.e. having the transaction appear successful to the system such that when parity is checked there will be no error). After this step 80, the computer system 10 then goes back to the Idle state, step 62.

If at step 76, it was determined that the RETRY flag was not set, then step 78 provides for the logging of the commander identification (C_ID) 13a and the setting of the RETRY flag indicating that that CPU 12a is going to request a retry to the read command issued since the data was unavailable. Thereafter, step 80 provides for the I/O bus interface 16 to acknowledge the command, but assert the CERR_L signal for the transaction while driving "faux" data with good parity. The purpose of driving fake data with good parity, is to avoid the logging of an error which would occur if no data was returned at all. After this point, the computer system goes back to the Idle state of step 62.

Now assuming that the response to step 72 was positive (yes) signifying that the data is available, this brings the flow of the computer system 10 to step 74. Step 74 notes that the RETRY flag is set. At step 82 the commander ID (C_ID) of this transaction is tested to determine if it is the same as the commander ID (C_ID) of the earlier transaction which first caused the setting of the RETRY flag. This comparison test is a 3-bit comparison of C_IDs rather than a larger (i.e. 40-bit address) comparison. This saves time for the I/O bus interface 16 since all it really needs to know to respond to the retried transaction is the C_ID. A positive response to step 82 signifies that the same CPU is requesting the same command as when it was first retried. This leads to step 83 which tests for secondary I/O 15 errors, such as parity, time-out, or invalid address. If the determination in step 83 is that there is an error, then, in step 85, the I/O bus interface 16 will not acknowledge (NO ACK) receipt of the command and address and will abort the transaction along with clearing the RETRY flag. Thereafter, the computer system will return to the Idle state of step 62. If the determination in step 83 is that there is no secondary I/O 15 error, the I/O bus interface 16 will respond to the transaction which is being retried and return the requested data to the CPU 12a in step 84. The I/O bus interface 16 will also, at step 84, acknowledge the command by asserting an ACK signal to the commander node and will clear the RETRY flag as well. Upon completion of step 84, the computer system 10 returns to the Idle state, step 62.

A negative response to step 82 signifies that the saved commander ID and the current commander ID are different, thus a different CPU is requesting a command than the earlier retried transaction. With RETRY flag being set and a different CPU requesting the command, the I/O module 19 will respond to the command and return "faux" or fake data with good parity to the CPU 12a in step 80, along with acknowledging receipt of the command/address information by asserting an ACK signal and further asserting the CERR_L signal indicating to the CPU 12a that it should retry the transaction. The I/O module 19 drives this false data and asserts the CERR_n signal to make the transaction appear to the rest of the system outside of the commander, as if it took place so that an error is not logged. Upon completion of step 80, the computer system 10 returns to the Idle state, step 62.

Figure 3:
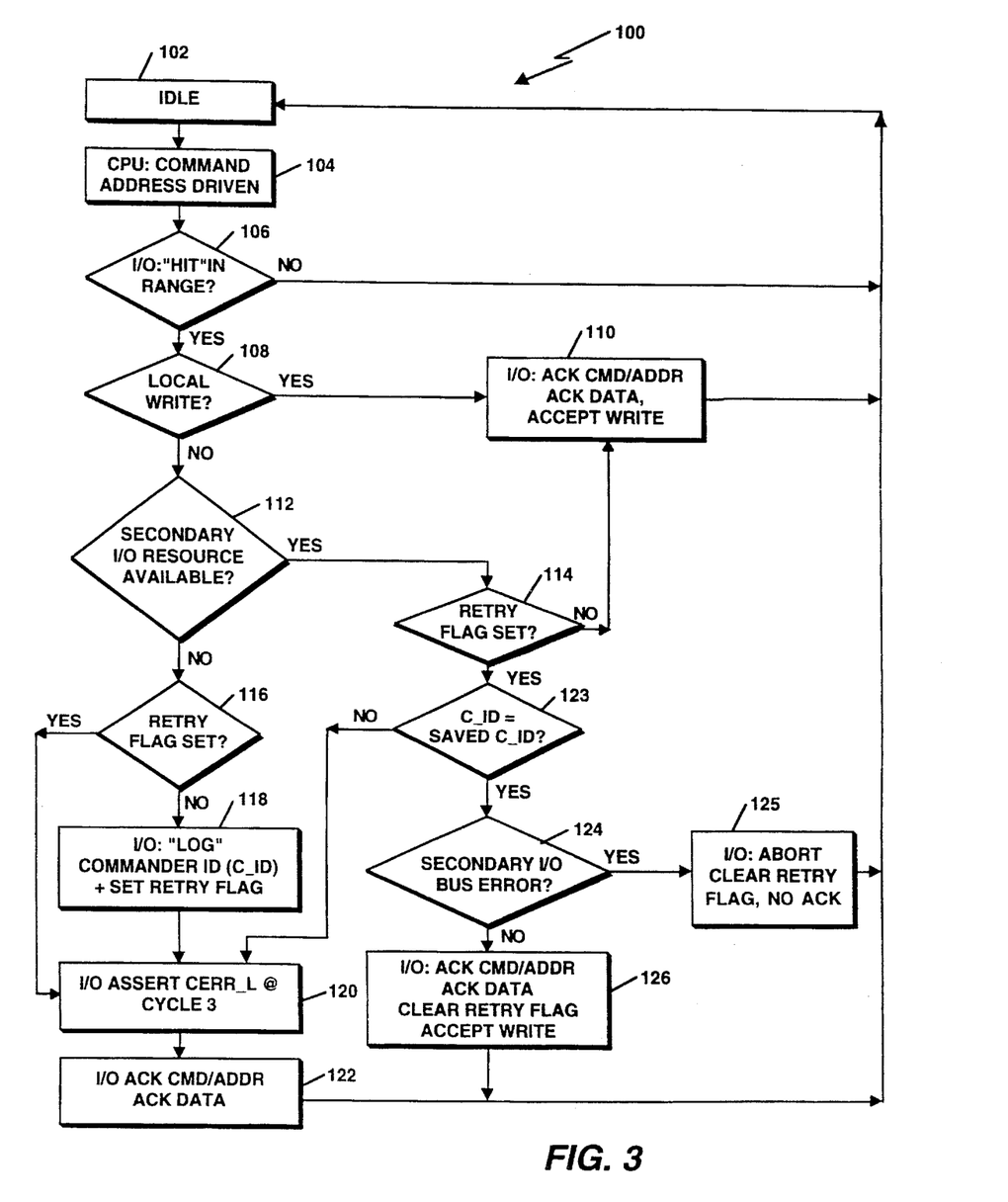
FIG. 3 is a detailed flow diagram of a write to I/O space involving retries.

Referring now to FIG. 3, a similar flow sequence 100 as that of FIG. 2, is shown for a write request to a designated I/O module 19 with steps performed by the CPU 12a and I/O module 19 as shown.

In step 102, the computer system 10 is shown to be Idle and waiting for the commander node, CPU 12a, to issue a write command. Step 104 indicates that the CPU 12a generates an I/O write command on the system bus 20 with the address of the designated location in I/O module 19 where it wants to "write" data. Step 106 of the flow diagram, labelled "I/O: Hit in Range?" effectively tests whether the location of the data that is being written by the CPU 12a is in the range of the I/O module's 19 space. A negative (No) response to the latter test leads back to step 102 or the Idle position step. A positive (yes) response to the latter test brings a second test 108, labelled "local write?" Step 108 here essentially determines if the location is locally available in I/O bus interface 16. If the result to the test in step 108 is an affirmative yes, the I/O module 19 will, in step 110, accept the write data which will come from the CPU bus interface 22a over system bus 20, through I/O bus interface 16 to the I/O module 19. Further, the I/O module 19 will acknowledge the write command by asserting an ACK signal to the commander node. If the result to the test in step 108 is negative (No), then step 112 determines if the secondary I/O 15 resource is available. Here again, there can be positive (Yes) and negative (No) responses. The response will be positive if the secondary I/O 15 resource is available to perform the transaction and the data is ready. The response will be negative if the secondary I/O 15 resource is not available to perform the transaction.

Assuming first that there is a negative response to step 112 which indicates that the I/O module 19 is not ready and leads to step 116 in the flow sequence. Step 116 tests the RETRY flag. The RETRY flag will only have been set if the I/O module had previously requested a transaction to be retried. If that is the case, then the next step in the flow 120 provides for the I/O module 19 to assert the CERR_L signal during cycle 3 to indicate to the CPU 12a that the CPU 12a should retry the transaction. Following step 120 is step 122 which provides for the I/O module 19 to appear to accept the write, acknowledging receipt of the command, address, and data by asserting an ACK signal to the commander node. After this point, the computer system 10 goes back to the Idle state, step 102.

If the response to step 116 was negative, then step 118 provides for the logging of the commander identification (C_ID) 13a and the setting of the RETRY flag by the I/O interface 16 indicating that CPU 12a is going to retry the write command since the secondary I/O 15 resource was unavailable. Thereafter, step 120, as described above, provides for the I/O module 19 to assert the CERR_L signal during cycle 3 for the transaction and step 122 provides for the I/O module 19 to acknowledge the command/address and data by asserting an ACK signal. After this point, the computer system 10 goes back to the Idle state of step 102.

Now assuming that the response to step 112 was positive (yes) which signifies that the secondary I/O 15 resource is available. This brings the flow of the computer system 10 to step 114. Step 114, like step 116, tests if the RETRY flag is set. A negative response indicates, in step 110, that the I/O module 19 will acknowledge the command/address and accept the write data since the secondary I/O 15 resource is available and ready and no earlier transaction has been retried. At the completion of step 110, the computer system 10 goes back to the Idle state of step 102. A positive response to step 114 indicates that a RETRY flag has been set by an earlier transaction and leads to step 123. At step 123, the commander ID (C_ID) 13a of this transaction is tested to determine if it is the same as the commander ID (C_ID) 13 of the earlier transaction which set the RETRY flag. This comparison test is a 3-bit comparison of C_IDs rather than a larger (i.e. 40-bit address) comparison. This saves time for the I/O bus interface 16 since all it really needs to know to respond to the retried transaction is the C_ID.

A positive response to step 123 together with the RETRY flag being set, signifies that the same CPU is requesting the current command as the earlier transaction. The following step 124 tests if there are any secondary I/O bus 15 errors, such as parity, time-out, or invalid address errors. If the result of step 124 is that there is an error, then, in step 125, the I/O bus interface 16 will not acknowledge (NO ACK) receipt of the command, address and data and will abort the transaction along with clearing the RETRY flag. Thereafter, the computer system will return to the Idle state of step 62. If the determination in step 124 is that there is no secondary I/O 15 error, the I/O bus interface 16 will, at step 126, acknowledge the command, address and data by asserting an ACK signal to the commander node and will respond to the command which is being retried by accepting the write data from the CPU 12a. The I/O bus interface 16 will clear the RETRY flag as well. Upon completion of step 126, the computer system 10 returns to the Idle state, step 62.

A negative response to step 124 signifies that the saved commander ID and the current commander ID are different, thus a different CPU is requesting a command than the earlier retried transaction. With the RETRY flag being set and a different CPU requesting the command, the I/O module 19 will respond to the command which is being retried by asserting the CERR_L signal at cycle 3 in step 120. And further, in step 122, the I/O module 19 will acknowledge receipt of the command/address and data by asserting an ACK signal to the commander node, CPU 12a. The I/O module 19 asserts the CERR_L signal and acknowledges this write data to make the transaction appear as if it took place to the system 10 such that an error is not logged. In actuality, the write transaction is not completed since the secondary I/O 15 resource is not yet available as was discussed above in going from step 112 to step 116. Upon completion of step 122, the computer system 10 returns to the Idle state, step 102.

Referring now to FIG. 4, a timing diagram 140 depicting typical error cycles is shown. Error signals CERR_L 142, 144, and 146 are shown to be active low signals. CERR_L 142 is an error signal that is asserted during the idle cycle and deasserted during the next cycle, as shown in diagram 140. CERR_L 144 is an error signal that is asserted during cycle 0 and deasserted during the next cycle, as shown in diagram 140. CERR_L 146 is an error signal that is asserted during cycle 1 and deasserted during the next cycle, as shown in diagram 140. There are no error signals indicated in cycles 3 and 4, which is where a retry mechanism is "layered". The commander node knows to decode such a CERR_L signal during cycles 3 to 4 as a retry rather than as a typical (i.e. parity) error signal, such as CERR_L signals 142, 144, and 146.

READ—NO RETRY, NO ERROR

Figure 5A:
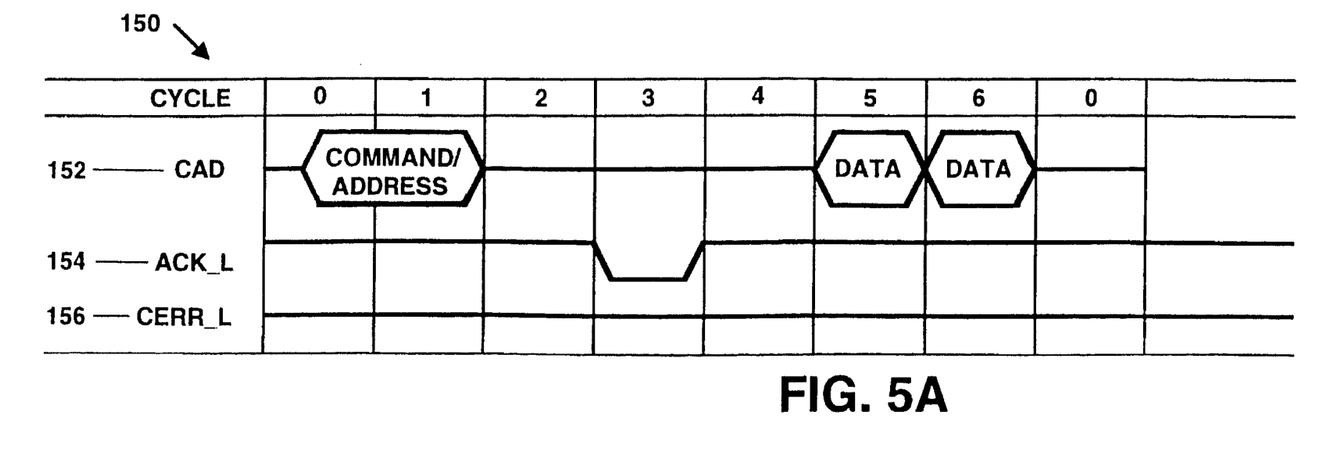
FIG. 5A is a timing diagram indicating a read with no retry and no errors.

Referring now to FIG. 5A, a timing diagram 150 is shown for a typical read request initiated by the CPU 12a to have the CPU 12a read data at I/O module 19. CAD signal 152 is shown to indicate that the Command and Address information are sent by the CPU 12a during cycles 0 and 1. Subsequently, an ACK signal 154 which is active low will occur in cycle 3, acknowledging the receipt of the command by the I/O module 19. During cycles 5 and 6 the CAD signal 152 from the I/O module 19 will send the data to the CPU 12a. Note that there is no CERR_L 156 signal activated in diagram 150 during cycles 3 to 4, which indicates that there is no retry requested. This signifies that the I/O module 19 is available to perform the transaction.

READ with RETRY

Figure 5B:
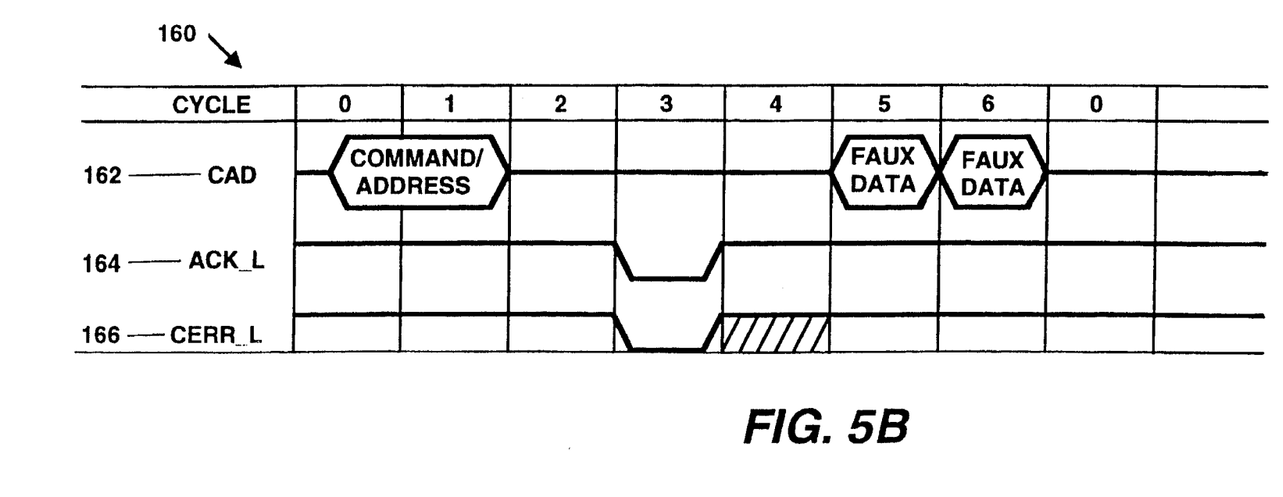
FIG. 5B is a timing diagram indicating a read with a retry.

Referring now to FIG. 5B, a timing diagram 160 is shown for a read request initiated by the CPU 12a to have the CPU 12a read data from I/O module 19 involving a retry. CAD signal 162 is shown to indicate that the Command and Address information are sent by the CPU 12a to I/O module 19 during cycles 0 and 1. Subsequently, an ACK signal 164 sent by the I/O module 19 which is active low will occur in cycle 3, acknowledging the receipt of the command by the I/O module 19. During cycles 5 and 6, the I/O module 19 should send the data to the CPU 12a. Here, however, CERR_L signal 166 is asserted by the I/O module 19 in cycle 3 and deasserted in cycle 4. This indicates that the I/O module 19 requests the transaction be retried signifying that the I/O module 19 is not available to perform the transaction and that the CPU 12a should retry the transaction. Therefore, the I/O module 19 will send "faux" or fake data back to the CPU 12a with good parity during cycles 5 and 6. The I/O module 19 drives this false data to give the system the impression that the transaction took place such that when parity is tested no error will surface. The CPU 12a, however, will know to decode this CERR_L signal 166 when it is asserted during cycle 3 as an indication that it should retry the read transaction because the data is not available at the I/O bus interface 16.

RETRY READ with ABORT

Figure 5C:
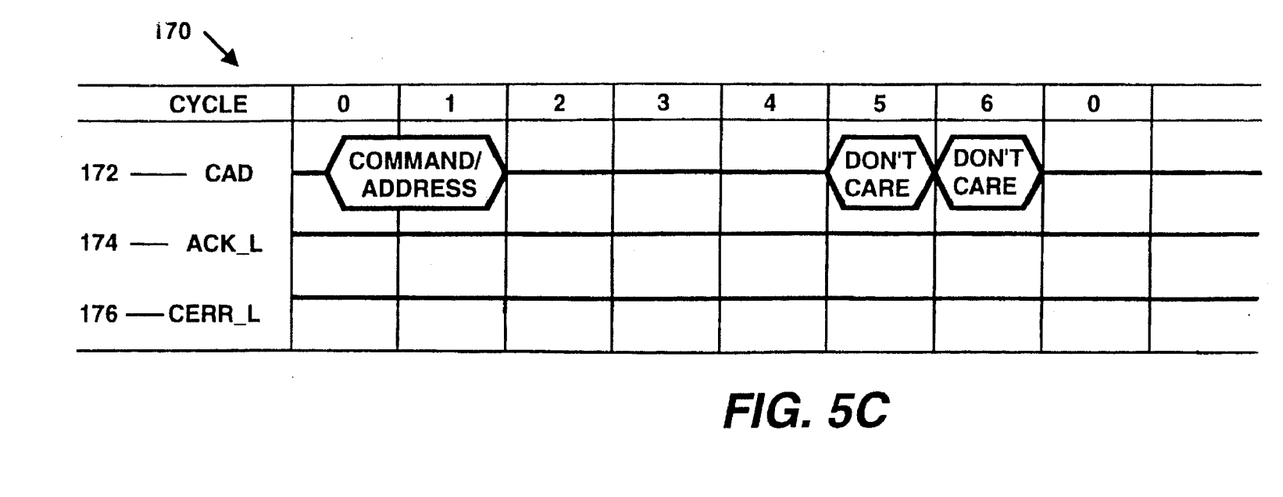
FIG. 5C is a timing diagram indicating a retry read with an abort.

Referring now to FIG. 5C, a timing diagram 170 is shown for a read request initiated by the CPU 12a to have the CPU 12a read data from I/O module 19 involving a retry and an abort. CAD signal 172 is shown to indicate that the Command and Address information are sent by the CPU 12a to I/O module 19 during cycles 0 and 1. Subsequently, however, there is no ACK signal 174 sent by the I/O module 19 occurring in cycle 3, therefore there is no acknowledgement of receipt of the command and address by the I/O module 19. Thus, during cycles 5 and 6, the data appears in a "don't care" state because whether or not the I/O module 19 sends accurate data to the CPU 12a, the I/O module 19 is not acknowledging receipt of the command and address, and thus, no transaction will be performed. Accordingly, the command will be aborted. Note that CERR_L 176 is not asserted during cycle 3 for a retry because there is effectively no command for the CPU 12a to retry, since there is no acknowledgement of the command and address (i.e. no ACK signal 174). This diagram 170 represents CPU 12a re-initiating a read transaction having been previously retried and which now gets aborted.

Figure 6A:
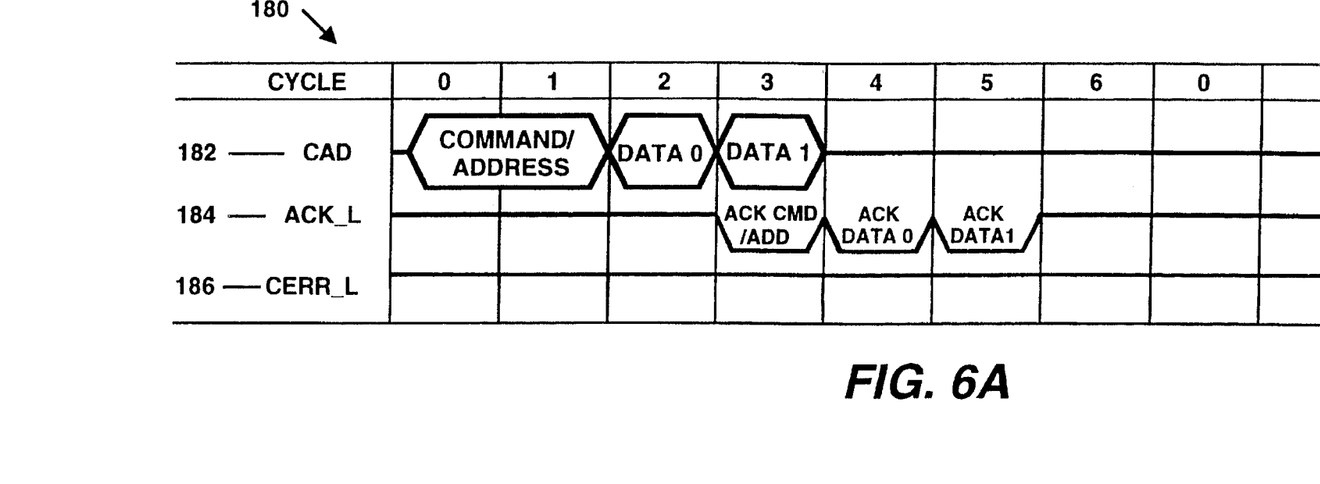
FIG. 6A is a timing diagram indicating a write with no retry and no errors.
Figure 6B:
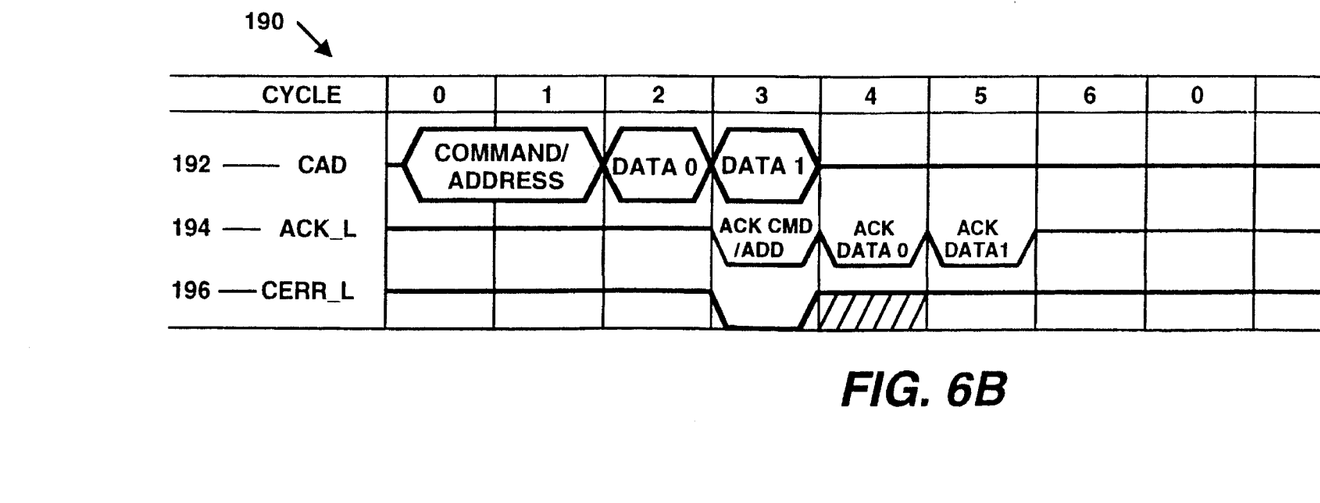
FIG. 6B is a timing diagram indicating a write with a retry.
Figure 6C:
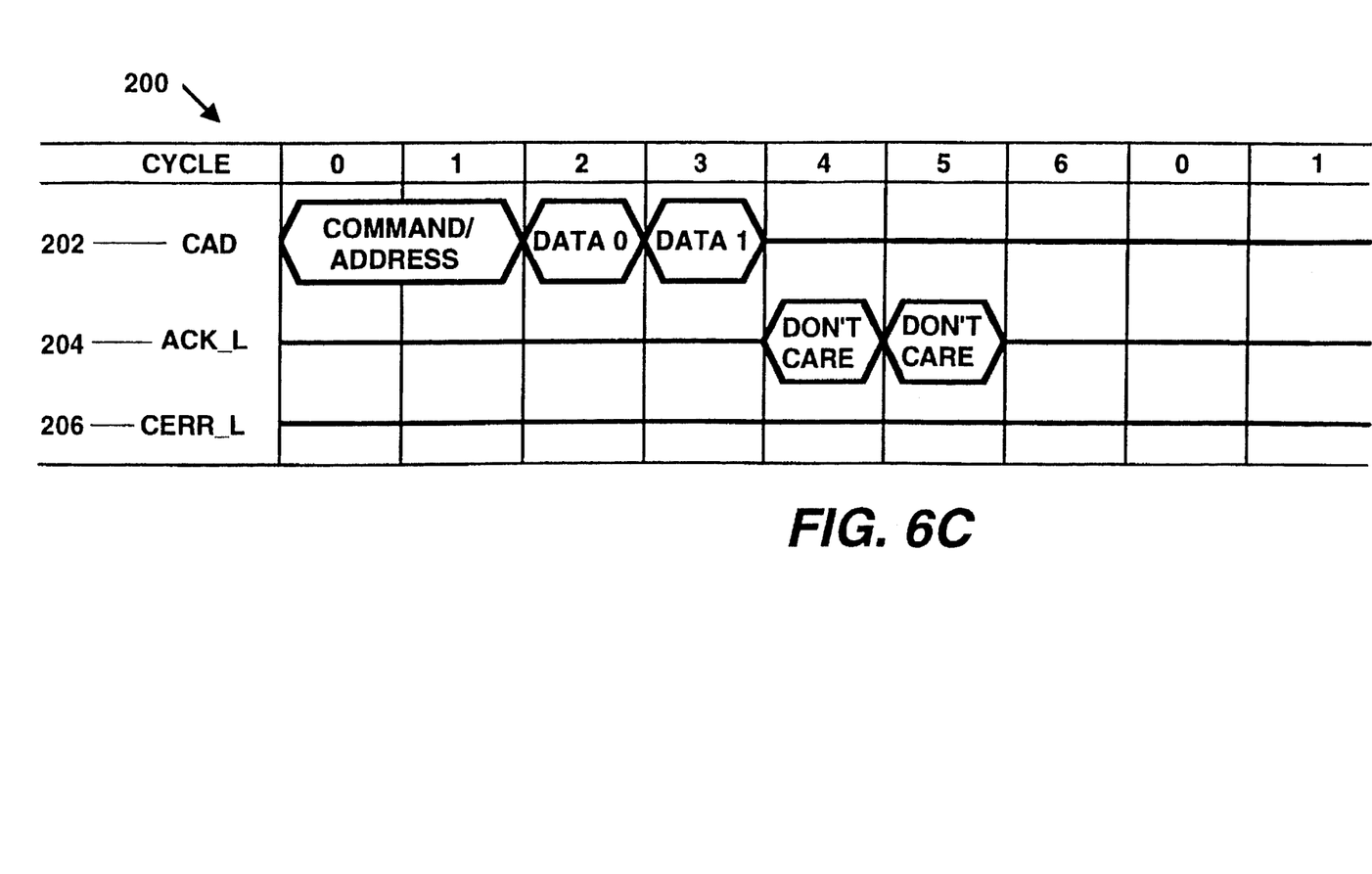
FIG. 6C is a timing diagram indicating a retry write with an abort.

A similar set of diagrams to the read command are depicted in FIGS. 6A–6C for the write command and are described below.

WRITE—NO RETRY, NO ERROR

Referring to FIG. 6A, a timing diagram 180 is shown for a typical write request from CPU 12a to write data to a location in I/O module 19 or secondary I/O 15. CAD signal 182 is shown to indicate that the Command and Address information are sent by the CPU 12a during cycles 0 and 1. During cycles 2 and 3, the CAD signal 182 from the CPU 12a will send the data to the I/O module 19. Subsequently, an ACK signal 184 from the I/O module 19 which is active low will occur in cycle 3, 4 and 5 acknowledging the receipt of the command/address, and two data cycles, respectively, by the I/O module 19. Note that there is no CERR_L 186 signal asserted in diagram 180 during cycles 3 to 4, indicating that the transaction is not requested to be retried. This signifies that the I/O module 19 is available to perform the write transaction.

WRITE with RETRY

Referring now to FIG. 6B, a timing diagram 190 is shown for a write request from CPU 12a to write data to a location in I/O module 19 or secondary I/O 15 involving a retry. CAD signal 192 is shown to indicate that the Command and Address information are sent by the CPU 12a to I/O module 19 during cycles 0 and 1. During cycles 2 and 3, CAD signal 192 from the CPU 12a will send the data to the I/O module 19. Subsequently, an ACK signal 194 sent by the I/O module 19 which is active low will occur in cycle 3, 4 and 5 acknowledging the receipt of the command/address and two data cycles, respectively, by the I/O module 19. Here, however, CERR_L signal 196 is asserted by I/O module 19 during cycle 3, which indicates that there is a retry asserted by the I/O module 19 signifying it is not available to perform the transaction and that the CPU 12a should retry the transaction.

RETRY WRITE with ABORT

Referring now to FIG. 6C, a timing diagram 200 is shown for a write request from CPU 12a to write data to a location in I/O module 19 or secondary I/O 15 involving a retry and an abort. CAD signal 202 is shown to indicate that the command and address information are sent by the CPU 12a to I/O module 19 during cycles 0 and 1. During cycles 2 and 3, CAD signal 202 from the CPU 12a will send the data to the I/O module 19. Subsequently, however, there is no ACK signal 204 asserted by the I/O module 19 occurring in cycle 3, therefore there is no acknowledgement of receipt of the command/address by the I/O module 19. Hence, CERR_L is not asserted during cycle 3 for retrying the write transaction. Thus, during cycles 4 and 5, the acknowledgement of the data appears in a "don't care" state because whether or not the CPU 12a sends accurate data to the I/O module 19, since the I/O module is not acknowledging receipt of the command and address, no transaction will be performed. Accordingly, the command will be aborted. This diagram 200 represents CPU 12a re-initiating a write transaction having been previously retried and which now gets aborted.

The computer system described above in FIGS. 1–6 also provides for a method for the commander node to disable this retry mechanism if the existing computer system is not compatible with the now provided retry mechanism (i.e. assertion of CERR_L during a cycle other than a defined or predetermined error cycle idle through 1, such as cycle 3). This disabling will cause the retry request given by the I/O interface 16 to be logged as an error, if it does occur in such a system, and no response to the transaction by the commander node will occur.

Having described a preferred embodiment of the invention, it will now become apparent to those of skill in the art that other embodiments incorporating its concepts may be provided. It is felt, therefore, that this invention should not be limited to the disclosed embodiment, but rather should be limited only by the spirit and scope of the appended claims.

I claim:

1. A data processing system comprising:

a plurality of nodes connected to a shared data path, one of said plurality of nodes being a commander node to initiate a transaction on said shared data path, and one of said plurality of nodes being a responder node;

means for asserting a signal by said responder node in a first plurality of predefined cycles;

means for providing, by said responder node, a response to said commander node indicating unavailability of said responder node wherein said response further comprises said means for asserting asserts said signal in a second, different plurality of predefined cycles and for providing an acknowledgement of said transaction over said shared data path; and means, directly responsive to said response indicating that said responder node is unavailable to respond to said transaction, for retrying said transaction.

2. A data processing system as in claim 1, wherein said means for said responder node to provide said response to said commander node, further comprises:

means, provided in said responder node, for saving identification information about said commander node.

3. A data processing system as in claim 2, wherein said means for saving identification information about said commander node, further comprises:

means, provided in said responder node, for comparing said identification information about said commander node with succeeding identification information about a succeeding commander node initiating a succeeding transaction.

4. A data processing system as in claim 1, wherein said means for said responder node to provide said response to said commander node, further comprises:

means for disabling said means for providing said acknowledgement, and for indicating to said commander node, in response to an error, that said responder node cannot complete said transaction, said means for disabling causing said commander node not to respond to said error, and said responder node to log said error.

5. A data processing system as in claim 1, wherein said means for retrying further comprises:

means for immediately rearbitrating for said shared data path.

6. A data processing system as in claim 1 wherein said acknowledgement by said responder node is accomplished by said responder node asserting an ACK signal to said commander node about said transaction.

7. A data processing system as in claim 1, wherein said means for said responder node to provide said response to said commander node, further comprises:

means for disabling said retry means if said data processing system is incompatible with said retry means, said means for disabling providing a logging of an error with no response to said retry means by said responder node.

8. A data processing system comprising:

a plurality of nodes connected to a shared data path, one of said plurality of nodes being a commander node to initiate a transaction on said shared data path, and one of said plurality of nodes being a responder node;

means for providing, by said responder node, a response to said commander node indicating unavailability of said responder node and for providing an acknowledgement of said transaction over said shared data path;

means, provided in said responder node, for saving identification information about said commander node; and means, directly responsive to said response indicating that said responder node is unavailable to respond to said transaction, for retrying said transaction.

9. A data processing system as in claim 8, wherein said means for saving identification information about said commander node, further comprises:

means, provided in said responder node, for comparing said identification information about said commander node with succeeding identification information about a succeeding commander node initiating a succeeding transaction.

10. A data processing system as in claim 8, wherein said means for said responder node to provide said response to said commander node, further comprises:

means for disabling said means for providing said acknowledgement, and for indicating to said commander node, in response to an error, that said responder node cannot complete said transaction, said means for disabling causing said commander node not to respond to said error, and said responder node to log said error.

11. A data processing system as in claim 8, wherein said means for retrying further comprises:

means for immediately rearbitrating for said shared data path.

12. A data processing system as in claim 8 wherein said means for retrying, further comprises:

means for asserting a signal indicating said retry means to said commander node.

13. A data processing system as in claim 8 wherein said acknowledgement by said responder node is accomplished by said responder node asserting an ACK signal to said commander node about said transaction.

14. A data processing system as in claim 8, wherein said means for said responder node to provide said response to said commander node, further comprises:

means for disabling said retry means if said data processing system is incompatible with said retry means, said means for disabling providing a logging of an error with no response to said retry means by said responder node.

* * * * *